United States Patent
Chou et al.

(10) Patent No.: US 10,396,577 B2
(45) Date of Patent: Aug. 27, 2019

(54) ELECTRONIC APPARATUS WITH ENVIRONMENTAL SENSING FUNCTION

(71) Applicant: POWERTECH INDUSTRIAL CO., LTD., New Taipei (TW)

(72) Inventors: Yi-Hsiung Chou, New Taipei (TW); Yu-Lung Lee, New Taipei (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 0 days.

(21) Appl. No.: 15/609,073

(22) Filed: May 31, 2017

(65) Prior Publication Data

US 2018/0212450 A1     Jul. 26, 2018

(30) Foreign Application Priority Data

Jan. 20, 2017    (TW) .............................. 106102155 A

(51) Int. Cl.
*H02J 7/00*        (2006.01)
*G01K 1/02*      (2006.01)

(52) U.S. Cl.
CPC .............. *H02J 7/0047* (2013.01); *G01K 1/02* (2013.01)

(58) Field of Classification Search
CPC ..................... H02J 7/02; G01K 1/02

USPC .................................................. 320/107, 111
See application file for complete search history.

(56) References Cited

U.S. PATENT DOCUMENTS

| | | | |
|---|---|---|---|
| 2011/0196547 A1* | 8/2011 | Park .................. | G06Q 50/06 700/296 |
| 2011/0298300 A1* | 12/2011 | Gray .................. | F24F 11/30 307/116 |
| 2016/0344138 A1* | 11/2016 | Kazmier .............. | G01R 21/133 |

\* cited by examiner

*Primary Examiner* — David V Henze-Gongola
(74) *Attorney, Agent, or Firm* — Li & Cai Intellectual Property (USA) Office

(57) ABSTRACT

The instant disclosure provides an electronic apparatus with environmental sensing function including an electronic device and a power cable. The power cable includes a plug and a cable connected between the electronic device and the plug. The plug has a sensor module and at least two power pins. The cable has at least an AC power cable and at least a DC transmission cable. The AC power cable is electrically connected to the two power pins, and the DC transmission cable is connected to the sensor module. The power cable is configured to transmit AC electrical power to the electronic device through the AC power cable. The electronic device executes a control command according to a sensing signal detected by the sensor module.

10 Claims, 4 Drawing Sheets

ELECTRONIC APPARATUS WITH ENVIRONMENTAL SENSING FUNCTION

BACKGROUND

1. Technical Field

The instant disclosure relates to an electronic device, and in particular, to an electronic device with environmental sensing function.

2. Description of Related Art

Sensors are used to detect events or changes in the environment, and are able to convert such events or changes into digital data. Generally, sensors are products made independently in accordance with the function and operation principle thereof. Sensors can also be installed inside of other products to allow these products to have sensing function. For example, a temperature sensor is generally installed on the main body of an air conditioner, and a smoke detector is generally installed in specific locations or spaces as an independent product.

However, when a sensor is intended to be used in providing a product with additional function, the main structural design of the product must be adjusted for accommodating the sensor. In addition, when a sensor is installed inside of the main body of a product, the function of the sensor may be affected by the interference generated by the product (such as temperature or humidity), thereby decreasing the detection accuracy of the sensor.

SUMMARY

The instant disclosure provides an electronic apparatus with environmental sensing function for solving the problems mentioned above. The electronic apparatus has a sensor module disposed on a plug of a power cable, thereby allowing the electronic apparatus to have the function of environmental sensing.

An embodiment of the instant disclosure provides an electric apparatus with environmental sensing function including an electronic device and a power cable. The power cable includes a plug and a cable. The cable is connected between the electronic device and the plug. The plug has a sensor module and at least two power pins, and the cable has at least an alternating current power cable and a direct current transmission cable. The alternating current power cable is connected to the two power pins, and the direct current transmission cable is connected to the sensor module. The power cable transmits an alternating current to the electronic device through the alternating current power cable, and the electronic device executes a control command according to a sensing signal obtained by the sensor module.

The advantage of the instant disclosure resides in that the electronic apparatus provided by the instant disclosure can have environmental sensing function based on the design of "the power cable includes a plug and a cable; the cable is connected between the electronic device and the plug; the plug has a sensor module and at least two power pins" and "the power cable transmits an alternating current to the electronic device through the alternating current power cable, and the electronic device executes a control command according to a sensing signal obtained by the sensor module".

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
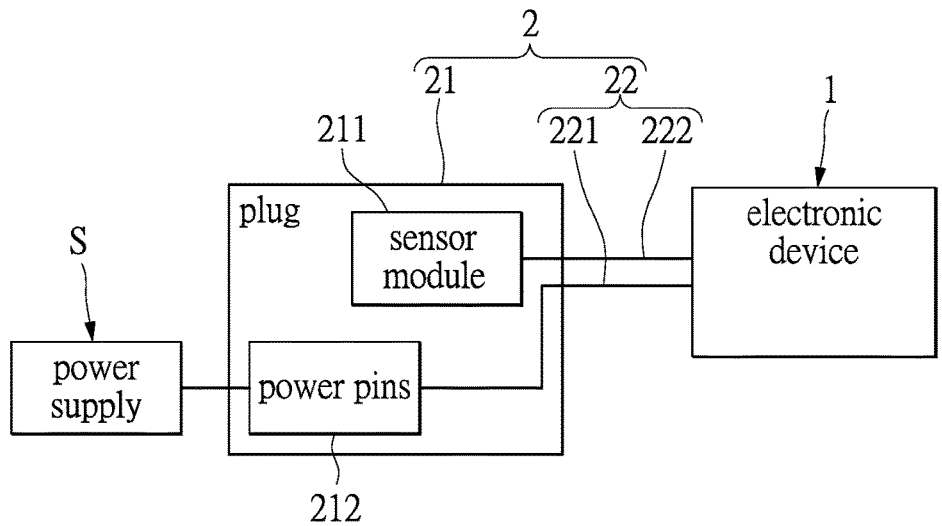
FIG. 1 is a block diagram of the electronic apparatus with environmental sensing function provided by an embodiment of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

Referring to FIG. 1, an electronic apparatus A includes an electronic device 1 and a power cable 2. The power cable 2 includes a plug 21 and a cable 22 connected between the electronic device 1 and the plug 21. For example, in the embodiment of the instant disclosure, the electronic device 1 is an electronic product that can be operated under commercial power, such as home appliances. Home appliances include heaters, air-conditioners, refrigerators, media equipment such as televisions or a stereo system, ovens, fans or washing machine. However, the types and functions of the electronic device 1 are not limited in the instant disclosure.

Figure 3:
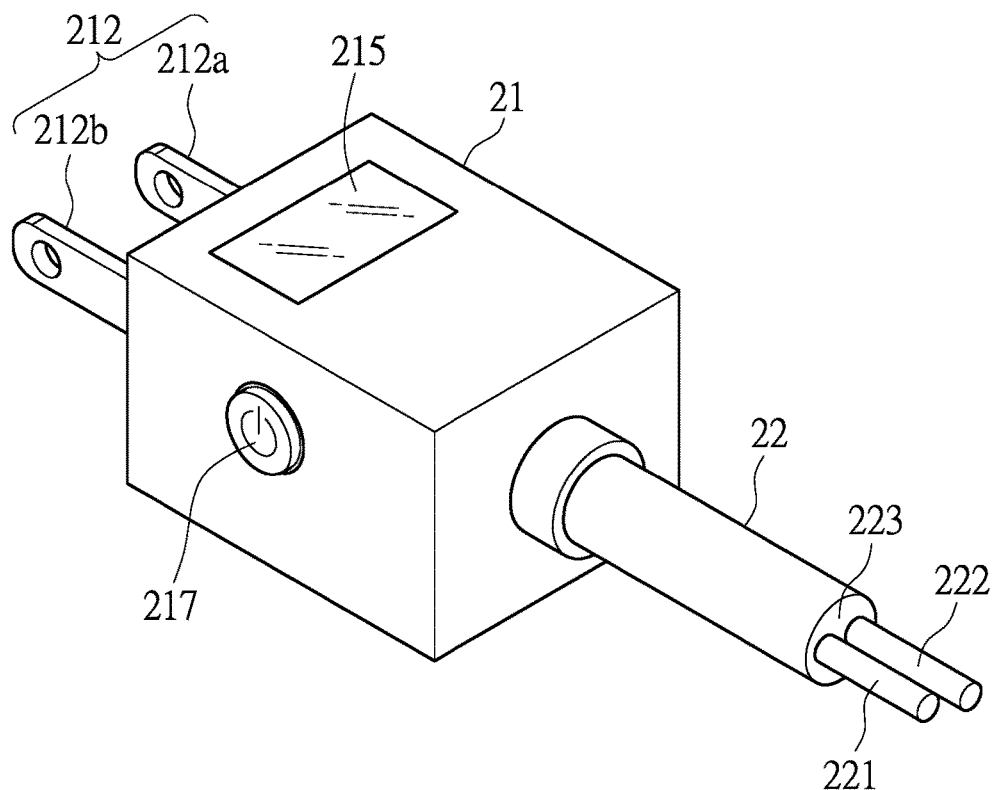
FIG. 3 is a schematic view of the power cable of the electronic device of the electronic apparatus with environmental sensing function provided by an embodiment of the instant disclosure.

Referring further to FIG. 3, the plug 21 of the power cable 2 can have a casing made of plastic materials (not numbered) and has at least two power pins 212 extended from the body of the plug 21. The power pins 212$a$ is a fire pin, and the power pins 212$b$ is a neutral pin. In addition, the plug 21 of the power cable 2 can further include a third power pin (not shown), such as a ground pin.

The power pins 212 are configured to be plugged into a socket providing alternating current, and hence, alternating current can be transmitted to the electronic device 1 through the plug 21 and the cable 22. The socket can be arranged on a wall or a socket disposed on a power extension wire. In FIG. 1, the power pins 212 are connected to the power supply S. In addition, the specific shape or material of the power pins 212 can be designed according to various requirements and are not limited in the instant disclosure.

Referring to FIG. 3, in addition to the power pins 212a, 212b exposed from the surface of the body of the plug 21, the exterior of the plug 21 can include a display unit 215 for displaying the power consumption status of the electronic device 1 or the sensing signal S1 detected by the sensor module 211 of the plug 21. For example, the display unit 215 can be a display such as a liquid crystal display or an organic light emitting diode (OLED) display. In another embodiment, the display unit 215 is a light such as a light emitting diode light. However, in the instant disclosure, the types of the display 215 are not limited.

The power consumption status of the electronic device 1 includes the on/off status and the electricity consumption thereof, and the sensing signal S1 can be the temperature, the humidity, the air flow or the lighting or other parameters in the environment. The details regarding the sensing signal S1 and the sensor module 211 for detecting the sensing signal S1 will be described later.

In addition, a button 217 can be disposed on the exterior surface of the plug 21 for switching the on/off status of the electronic device 1. The arrangements of the display 215 and the button 217 are not limited in the instant disclosure, and FIG. 3 is only an illustration of an embodiment of the instant disclosure.

Figure 4:
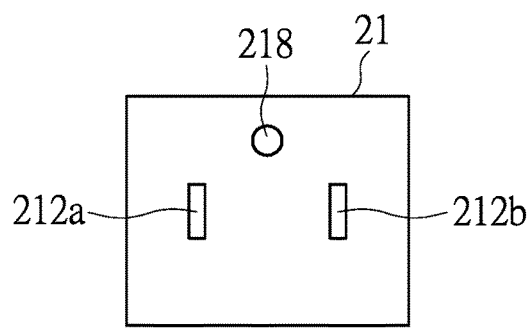
FIG. 4 is a front view of the power cable shown in FIG. 3.

Referring to FIG. 4, the plug 21 of the electronic apparatus A in the embodiments of the instant disclosure can further have a metal contact 218 exposed from the surface of the plug 21 for being electrically connected between the direct current transmission cable 222 of the cable 22 and an external socket. The details regarding the direct current transmission cable 222 will be described later. For example, the metal contact 218 can be used for transmitting a signal from the electronic apparatus A to external devices. In addition to jacks for inserting the power pins 212a, 212b, the external socket can have a metal contact to cooperate with the metal contact 218 for allowing signal transmission. The metal contact of the external socket can be connected to a personal computer of a user or other electronic apparatuses through transmission lines.

Therefore, when the power pins 212a, 212b of the plug 21 of the power cable 2 are plugged into the jacks of the external socket, the metal contact 218 of the plug 21 and the metal contact of the socket can have an electrical contact therebetween. The socket can thereby not only supply power to the electronic apparatus A, but also allow signal transmission between the electronic apparatus A (through the plug 21) and an external transceiver.

Referring to FIG. 1, the plug 21 of the embodiments of the instant disclosure further has a sensor module 211. The sensor module 211 is a temperature sensor, a humidity sensor, a gas sensor, an optical sensor or any combination thereof. The sensor module 211 is used to detect or sense various parameters in the environment in which the electronic apparatus A is located. For example, the sensor module 211 is for detecting the environmental temperature, the environmental humidity, the flow of the gas in the environment or quantity of lighting. However, the specific structure and functions of the sensor module 211 are not limited in the instant disclosure.

The sensor module 211 can be disposed inside of the plug 21 of the electronic apparatus A and have a sensing unit. As shown in FIG. 1, the sensor module 211 can be electrically connected to the electronic device 1 through the direct current transmission cable 222 of the cable 22. Therefore, the sensing signal S1 detected by the sensor module 211 can be transmitted to the electronic device 1 through the direct current transmission cable 222. The electronic device 1 can execute control commands based on the sensing signal S1.

Referring to FIG. 1 and FIG. 3, the cable 22 has at least an alternating current power cable 221 and at least a direct current transmission cable 222. In addition, the cable 22 can have an insulating layer 223 enclosing the alternating current power cable 221 and the direct current transmission cable 222. In other words, the alternating current power cable 221 and the direct current transmission cable 222 are both encapsulated by the insulating layer 223. For example, in an embodiment, the alternating current power cable 221 and the direct current transmission cable 222 are insulated from each other by a non-conductive coating (not shown). In another embodiment, the alternating current power cable 221 and the direct current transmission cable 222 are respectively enclosed by one single inner insulating layer (not shown) for preventing the alternating current power cable 221 and the direct current transmission cable 222 from contacting with each other before being enclosed by the insulating layer 223 for forming the cable 22. The insulating layer 223 can be made of a material which is heat-resistant, flexible and non-conductive, such as thermoplastic polymers. The insulating layer 223 can insulate the alternating current power cable 221 and the direct current transmission cable 222 in the cable 22 from an external environment, thereby improving the safety and stability of the cable 22.

In the embodiments of the instant disclosure, the alternating current power cable 221 is used as a transmission path for alternating current. The alternating current can be provided by the socket (such as from the power supply S). The direct current transmission cable 222 is used as a transmission path of the direct current signal. Therefore, the alternating current power cable 221 is electrically connected to the two power pins 212a, 212b of the plug 21. As mentioned above, the direct current transmission cable 222 is connected between the alternating current power cable 221 and the electronic device 1 for transmitting the sensing signal S1 detected by the sensor module 211 to the electronic device 1.

Figure 2:
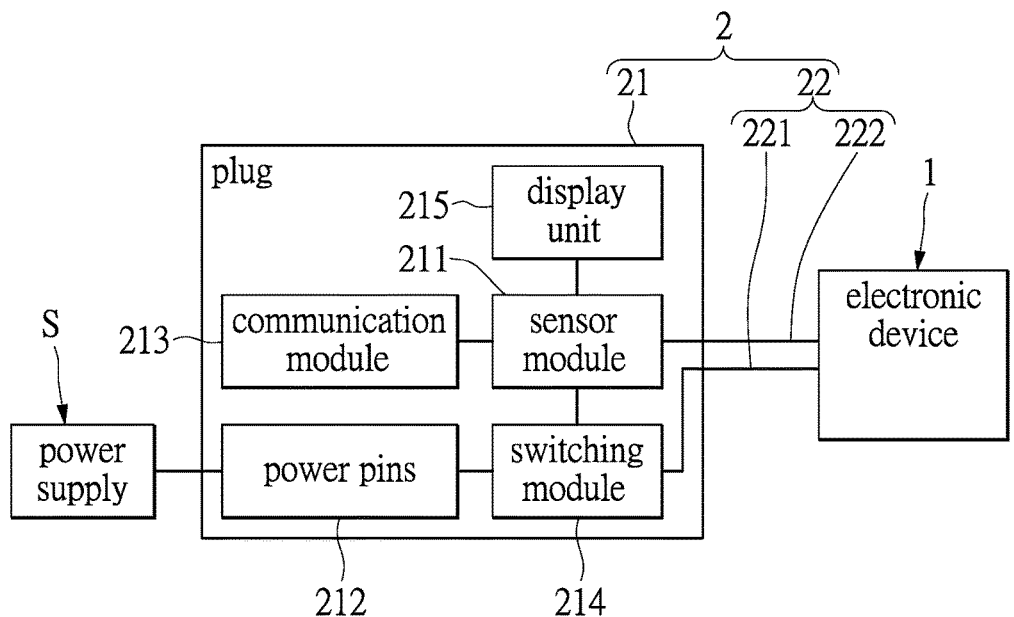
FIG. 2 is a block diagram of the electronic apparatus with environmental sensing function provided by another embodiment of the instant disclosure.

Referring to FIG. 2, the electronic apparatus A with environmental sensing function can further include a communication module 213. The communication module 213 is a wired communication module or a wireless communication module. A wired communication module requires physical linkage, e.g., cables, to establish signal transmission toward other devices. Specifically, a wired communication module can employ the metal contact 218 shown in FIG. 4 to achieve signal transmission. A wireless communication module can be an antenna or a Bluetooth device.

In addition, the data transceived by the wireless communication module can be transmitted between the communication module 213 and an electronic transceiver of a user, or between the communication module 213 and other functional modules (having transceiving function) disposed in the plug 21 in the form of radio waves. In one of the embodiments of the instant disclosure, the communication module 213 is a Bluetooth device and the data processed by the communication module 213 is transmitted in Wireless PAN in the form of Bluetooth wireless signals.

The plug 21 of the electronic apparatus A can transmit signals to electronic products having transceivers (such as other home appliances) through the communication module 213, or receive signals from electronic products having transceivers (such as a smart phone of a user) through the communication module 213. Therefore, a smart electric power management can be achieved. For example, the communication module 213 can be connected to the sensor module 211 for receiving the sensing signal S1 from the sensor module 211. The sensing signal S1 would be further transmitted to the external electronic device E through the communication module 213.

The plug 21 of the electronic apparatus A can further include a switching module 214. The switching module 214 can be connected to at least one of the electronic device 1, the sensor module 211, the power pins 212 and the communication module 213. In the embodiment shown in FIG. 2, the switching module 214 is connected to the electronic device 1, the sensor module 211 and the power pins 212. However, the connection manner between the switching module 214 and the functional modules in the electronic apparatus A or any external devices can be changed according to actual needs. The function provided by the switching module 214 will be described in detail in view of the schematic views of signal and power transmissions.

Figure 5:
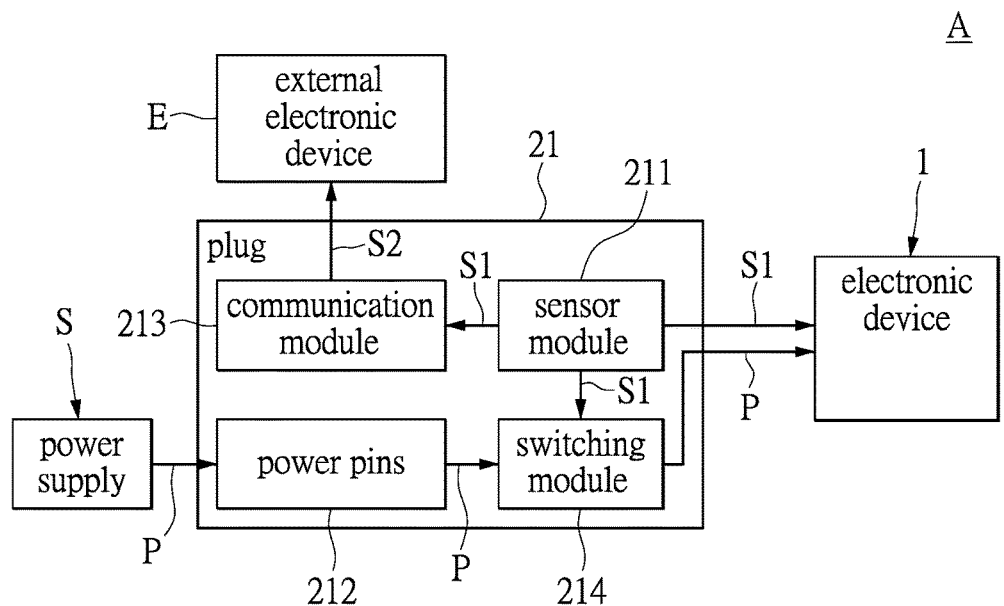
FIG. 5 is a schematic view of the signal and power transmission of the electronic apparatus with environmental sensing function provided by an embodiment of the instant disclosure.
Figure 6:
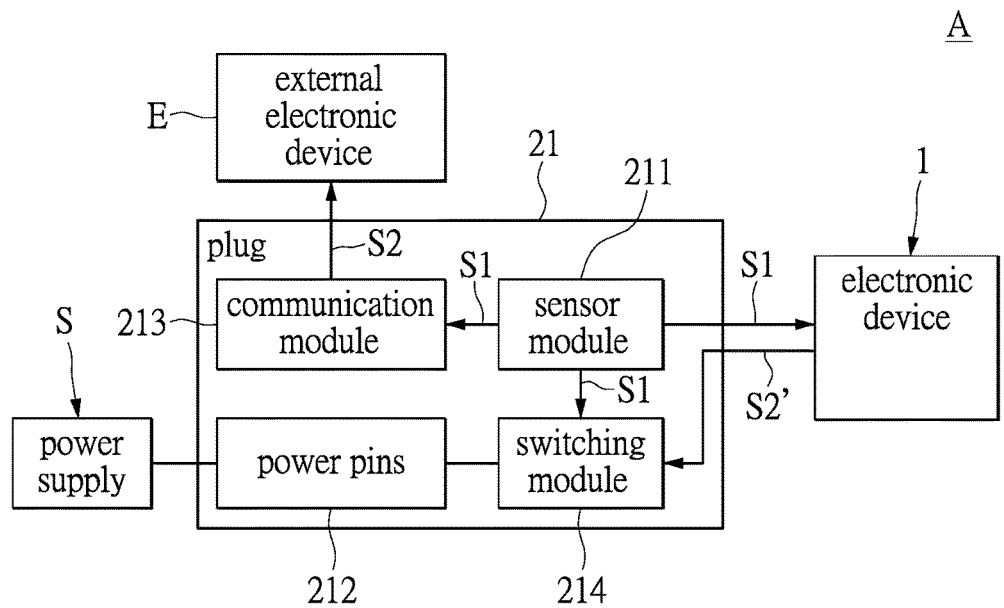
FIG. 6 is a schematic view of the signal and power transmission of the electronic apparatus with environmental sensing function provided by another embodiment of the instant disclosure.

Referring to FIG. 5 and FIG. 6, the plug 21 of the power cable 2 in the electronic apparatus A includes the sensor module 211, the power pins 212, the communication module 213 and the switching module 214. As shown in FIG. 5 and FIG. 6, the power pins 212 is used for transmitting alternating current P from the power supply S to the electronic device 1. A switching module 214 can be further disposed between the power pins 212 and the electronic device 1 for making or breaking the electrical connection between the electronic device 1 and the power supply S in accordance with the sensing signal S1 detected by the sensor module 211 (as illustrated in FIG. 5), or for making or breaking the electrical connection between the electronic device 1 and the power supply S in accordance with the control signal S2' output by the electronic device 1 (as illustrated in FIG. 6). In the embodiment shown in FIG. 6, the control signal S2' output by the electronic device 1 includes a control demand for turning on or turning off of the electronic device 1.

In other words, the switching module 214 can make or break the electrical connection between the electronic device 1 and the power supply S in accordance with the signals output by other signal output modules for controlling the operation mode (on or off) of the electronic device 1. In another embodiment, the switching module 214 can be electrically connected to the communication module 213 for making or breaking the electrical connection between the electronic device 1 and the power supply S in accordance to the signal (not shown) received by the communication module 213.

The sensor module 211 is connected between the electronic device 1, the communication module 213 and the switching module 214. The connection manner shown in FIG. 5 and FIG. 6 is only an example and can be changed or adjusted according to actual needs. For example, the sensor module 211 can be connected to the electronic device 1 through only the direct current transmission cable 222.

In the embodiment shown in FIG. 5 and FIG. 6, the sensor module 211 transmits the detected sensing signal S1 to at least one of the electronic device 1, the communication module 213 and the switching module 214. For example, when the electronic device 1 is a heater, a sensing signal S1 (such as a temperature value) can be transmitted to the electronic device 1 for allowing the electronic device 1 to execute control demands according to the sensing signal S1, for example, to turn on or turn off the power.

Still referring to FIG. 5 and FIG. 6, the sensor module 211 can also transmit the sensing signal S1 to the switching module 214 for making or breaking the electrical connection between the power supply S and the electronic device 1 through the switching module 214, thereby turning on or turning off the electronic device 1. For example, when the electronic device 1 is an electronic heater and the temperature value of the sensing signal S1 detected by the sensor module 211 exceeds a predetermined temperature, the switching module 214 breaks the electrical connection between the power supply S and the electronic device 1 (the electronic heater) to turn off the electronic device 1, thereby saving energy.

In addition, the sensor module 211 can transmit the sensing signal S1 to the communication module 213 for transmitting a control signal S2 to an external electronic device E through the communication module 213. For example, when the electronic device 1 is an electronic heater and the temperature value of the sensing signal S1 detected by the sensor module 211 is lower than a predetermined temperature, the communication module 213 transmits the control signal S2 including an activating demand to another electronic heater (the external electronic device E) for turning on this electronic heater, thereby providing a more efficient warming effect. In another situation, the sensor module 211 can transmit the sensing signal S1 to an electronic device (not shown) of a user through the communication module 213, allowing the user to monitor the parameters of the environment in which the electronic apparatus A is arranged.

Figure 7:
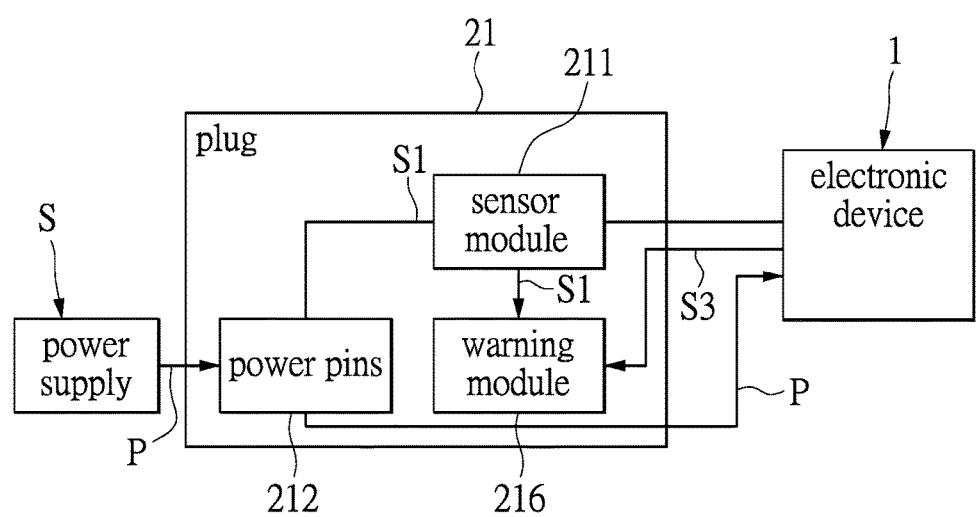
FIG. 7 is a schematic view of the signal and power transmission of the electronic apparatus with environmental sensing function provided by yet another embodiment of the instant disclosure.

Referring to FIG. 7, the plug 21 can further include a warning module 216 for generating a warning signal in accordance with the status of the electronic device 1 or the sensing signal S1 detected by the sensor module 211. Specifically, the warning module 216 can include a buzzer for generating a waning sound in accordance with the power consumption status of the electronic device 1. The warning module 216 can also be connected to the display unit 215 for generating a warning signal through the display unit 215.

For example, when the power consumption of the electronic device 1 is too high, the electronic device 1 transmits a power consumption signal S3 including the power consumption information to the warning module 216 for allowing the warning module 216 to generate the warning signal. The user is then informed to turn off the power of the electronic device 1 or adjust the operation mode of the electronic device 1.

The advantages of the instant disclosure resides in that the electronic apparatus A provided by the instant disclosure can have environmental sensing function without changing or adjusting the main structure of the electronic device 1 based on the design of "the power cable 2 includes a plug 21 and a cable 22; the cable 22 is connected between the electronic device 1 and the plug 21; the plug 21 has a sensor module 211 and at least two power pins 212" and "the power cable 2 transmits an alternating current to the electronic device 1 through the alternating current power cable 221, and the electronic device 1 executes a control command according to a sensing signal S1 obtained by the sensor module 211".

In other words, the electronic apparatus A provided by the instant disclosure can have the function of environmental sensing by disposing the sensor module 211 on the plug 21 of the power cable 2 which is conventionally used to provide power only. The design of the sensor module 211 on the plug 21 of the power cable 2 can avoid the information obtained by the sensor module 211 from being affected by the electronic device 1 and ensure more accurate detecting results (the sensing signal S1).

In addition, by disposing additional functional modules on the plug 21 of the power cable 2, the smart electric power management can be further achieved.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. An electric apparatus with environmental sensing function, comprising:
   an electronic device; and
   a power cable including a plug and a cable, the cable being connected between the electronic device and the plug, wherein the plug has a sensor module and at least two power pins, and the cable has at least an alternating current power cable and a direct current transmission cable, wherein the alternating current power cable is connected to the two power pins, a portion of the direct current transmission cable is exposed out of the plug, and the direct current transmission cable is directly connected to the sensor module and the electronic device;
   wherein the power cable transmits an alternating current to the electronic device through the alternating current power cable, and the electronic device executes a control command according to a sensing signal obtained by the sensor module through the direct current transmission cable.

2. The electric apparatus with environmental sensing function according to claim 1, wherein the sensor module is a temperature sensor, a humidity sensor, a gas sensor, an optical sensor or any combination thereof.

3. The electric apparatus with environmental sensing function according to claim 1, wherein the plug further includes a communication module electrically connected to the sensor module, the sensing signal obtained by the sensor module being transmitted to an external electronic device through the communication module, and the communication module being a wired communication module or a wireless communication module.

4. The electric apparatus with environmental sensing function according to claim 3, wherein the plug further includes a switching module electrically connected to the sensor module, and the switching module makes or breaks the electrical connection between the electronic device and a power supply.

5. The electronic apparatus with environmental sensing function according to claim 1, wherein the plug has a display unit electrically connected to the sensor module for displaying an operation status of the electronic device or the sensing signal obtained by the sensor module.

6. The electronic apparatus with environmental sensing function according to claim 1, wherein the plug has a button.

7. The electronic apparatus with environmental sensing function according to claim 1, wherein the plug has a metal contact exposed from a surface of the plug for being electrically connected between the direct current transmission cable and an external socket.

8. The electronic apparatus with environmental sensing function according to claim 1, wherein the plug further includes a warning module electrically connected to the sensor module, and the warning module generates a warning signal in accordance to an operation status of the electronic device or the sensing signal obtained by the sensor module.

9. The electronic apparatus with environmental sensing function according to claim 1, wherein the plug further includes a switching module electrically connected to the sensor module, and the switching module makes or breaks an electrical connection between the electronic device and a power supply.

10. The electronic apparatus with environmental sensing function according to claim 1, wherein the control command of the electronic device includes turn on or turn off a power of the electronic device.

* * * * *